Sept. 20, 1955   G. FRENGER   2,718,383
HEATING AND VENTILATION SYSTEM
Filed Feb. 7, 1947   3 Sheets-Sheet 1
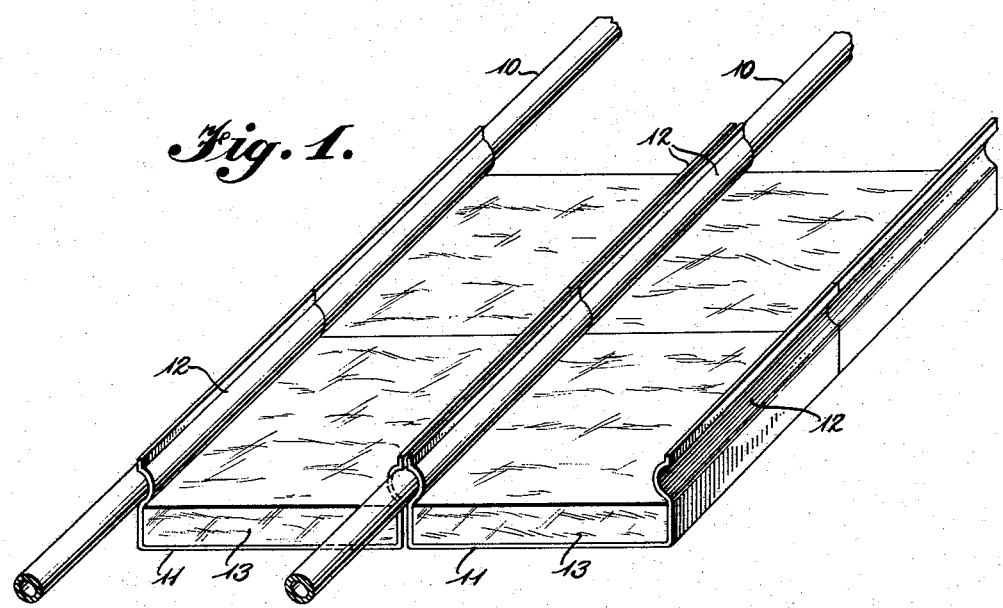
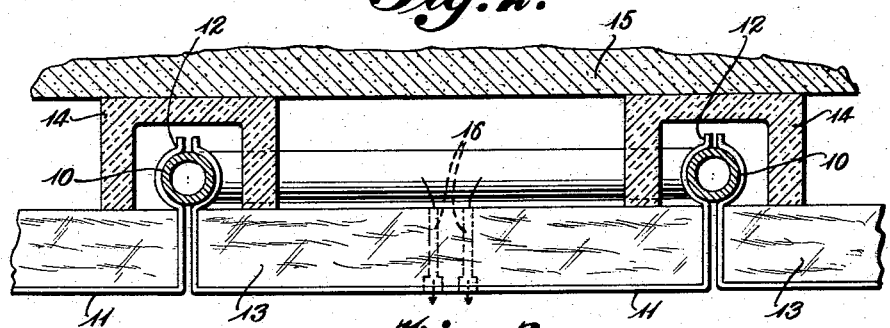
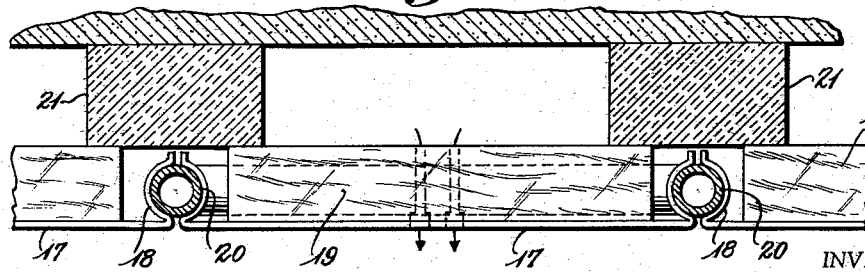
INVENTOR
*Gunnar Frenger*
BY *Stevens, Davis & Miller*
ATTORNEYS INVENTOR
*Gunnar Frenger*
BY *Stevens, Davis and Miller*
ATTORNEYS

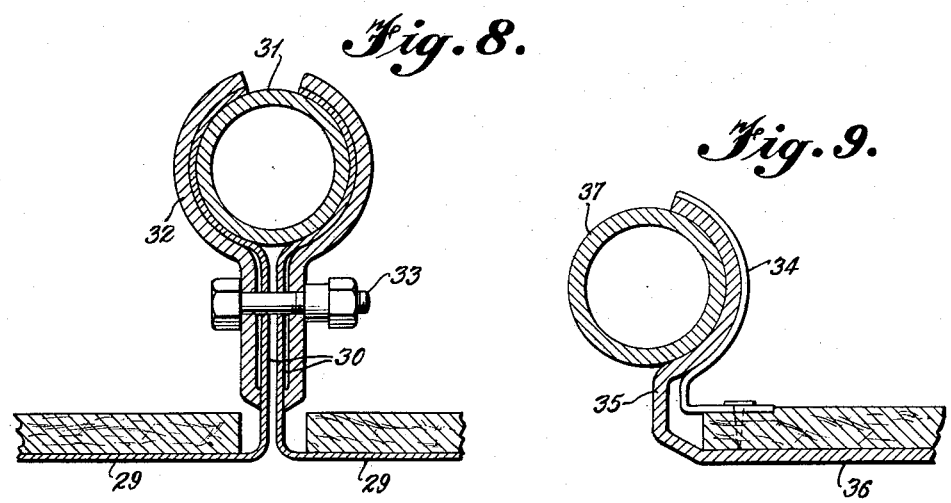
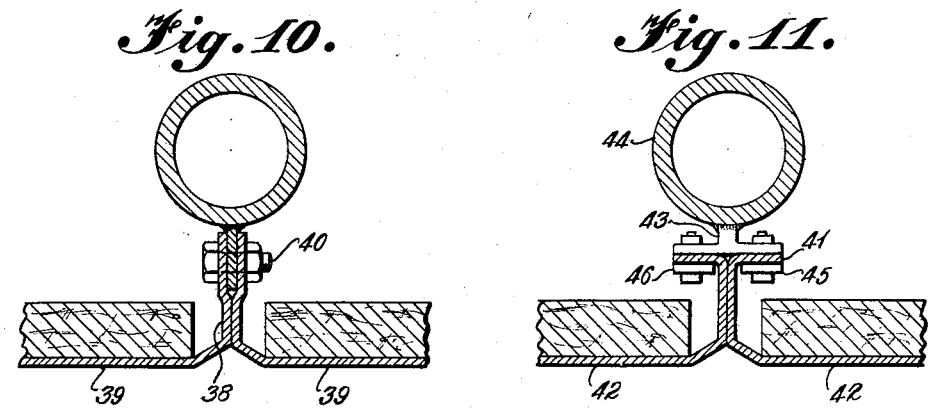
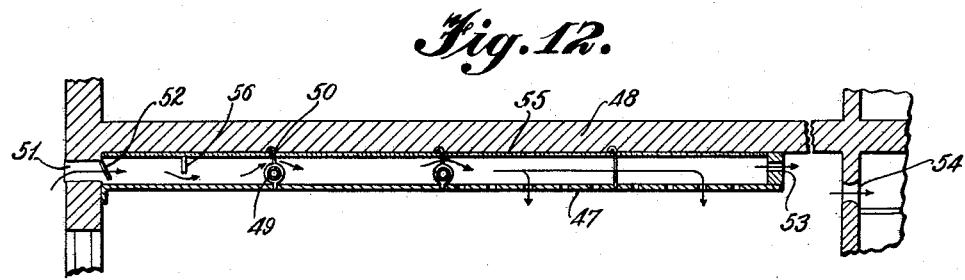
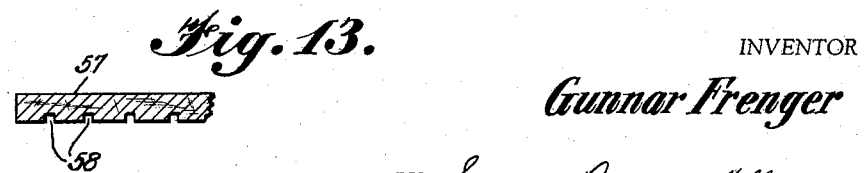

United States Patent Office 2,718,383
Patented Sept. 20, 1955

2,718,383

HEATING AND VENTILATION SYSTEM

Gunnar Frenger, Roa, V. Aker, Norway

Application February 7, 1947, Serial No. 727,005
In Sweden December 18, 1944

Section 1, Public Law 690, August 8, 1946
Patent expires December 18, 1964

14 Claims. (Cl. 257—124)

The present invention relates to a radiant heating or cooling system for enclosures of all kinds such as rooms in buildings or compartments in ships, railway cars, aircraft or the like. The invention also comprises a combined radiant heating or cooling system with an acoustic system, with a ventilating system, or with both.

It has been proposed prior to the present invention to provide an enclosure with a radiant heating surface. However, the prior art suggestions along this line involve structural features which impose such an economic burden on the installation as to militate to a considerable degree against its commercial acceptability. Furthermore, the installation of a radiant heating wall or ceiling was heretofore thought to be entirely inconsistent with an acoustic treatment due to the fact that most satisfactory sound absorbing materials are very poor heat conductors.

It is therefore an object of the present invention to overcome the foregoing difficulties and to provide a radiant heating or cooling system which may be made of prefabricated parts and is characterized by marked ease of installation and high thermal efficiency.

It is a further object of the present invention to provide a combined radiant heating or cooling system and acoustic system where the radiation elements constitute at least a part of the acoustic system.

It is a further object of this invention to provide a radiant heating or cooling system in which the radiation elements likewise perform a ventilating function and optionally an acoustic function as well.

Other objects and advantages of this invention will be apparent upon consideration of the following detailed description of several embodiments thereof in conjunction with the annexed drawings wherein:

Figure 1 is a fragmentary perspective view of a portion of a ceiling constructed according to the present invention;

Figure 2 is a fragmentary sectional view through a portion of a ceiling of the type shown in Figure 1 showing a perforated panel for the supply of air to the room;

Figure 3 is a view similar to Figure 2 but illustrating a panel made up of plates having marginal flanges shorter than those shown in Figures 1 and 2;

Figures 8, 9, 10 and 11 are detailed sectional views showing various arrangements for supporting the panels from the heating or cooling pipes;

Figure 12 shows in section a combined radiant heating, acoustic and ventilating ceiling constructed according to the present invention; and Figure 13 is a view in section of an acoustic-type panel without perforations.

Figure 4:
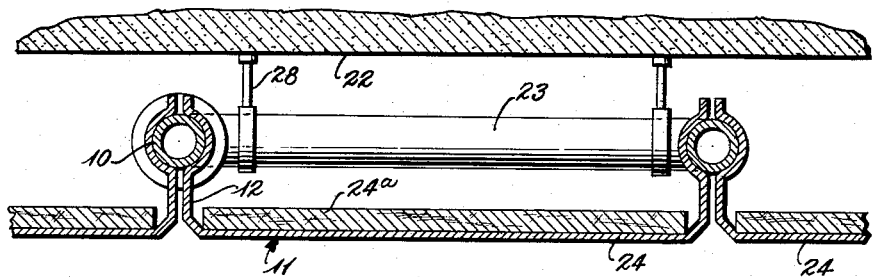
Figure 4 is a sectional view of an assembly such as is shown in Figure 1 except that the arrangement for hanging the heating pipes from the ceiling is illustrated.

Referring now in greater detail to Figure 1, the numeral 10 representes a part of a pipe system which is hung from a ceiling structure of a room in such a way that the pipes extend in mutually parallel relation in the plane of the intended radiant ceiling surface and spaced apart a distance to accommodate therebetween a plurality of heat transferring and radiation elements or panels 11 made of sheet metal. In the embodiment shown in Figure 1, panels 11 are provided with upwardly turned flanges 12 of a shape complementary to the shape of the pipes so as to make a close resilient fit against the pipe. Thus the elements 11 are maintained in good heat-exchange relation to the pipes 10 through respective edge portions 12. The pipes 10 may be made from any usual materials such as iron or copper and may be heated by passing hot water or steam therethrough or cooled by passing cold water therethrough. The panels 11, when fully installed, occupy the space between and under the pipes and present a substantially continuous heat radiation surface to the room. This exposed surface may be suitably treated or coated, as by painting, to increase its emissivity. In order to minimize heat loss and insure that the major portion of the heat delivered to the pipes will be delivered to the panels for radiation, an insulating layer 13 may be disposed within the panels, suitable materials being fiber plate or glass wool.

In Figure 2, an arrangement is shown in which the panel 11 and the insulating material 13 are provided with perforations and in which the pipes 10 are housed in insulating grooved members 14 which serve as spacers between the main ceiling designated at 15 in Figure 2 and the sub-ceiling defined by the radiation elements 11. The perforations which are designated by reference numeral 16 establish a passageway between the room which is to be heated and the plenum chamber defined between the panels 11 and the ceiling 15. It is therefore possible to supply relatively cool air to this plenum chamber and to distribute it into the room through the perforations at 16 while at the same time heating the panels 11 through their respective margins which are in contact with the pipes 10 so that the panels function to radiate heat into the room. By virtue of the invention an extremely pleasant and desirable effect is achieved when the air flowing through the distribution openings is considerably cooler than the temperature of the air in the room.

In Figure 3 the arrangement is quite similar to Figure 2 except that the panels which are here designated by numeral 17 are provided with shorter flanges 18 so that insulating material 19 resting on the panels extends higher than the top of the flanges. Thus a space is defined between adjacent panels and this space is occupied by heating pipes 20 similar in structure and function to the pipes 10. Instead of providing channel members such as 14 to insulate the pipes from the plenum chamber, a block of material 21 may extend between the ceiling and the top of the insulating material 19 functioning as a spacer and to protect pipes 20 against heat loss to the plenum chamber.

Figure 5:
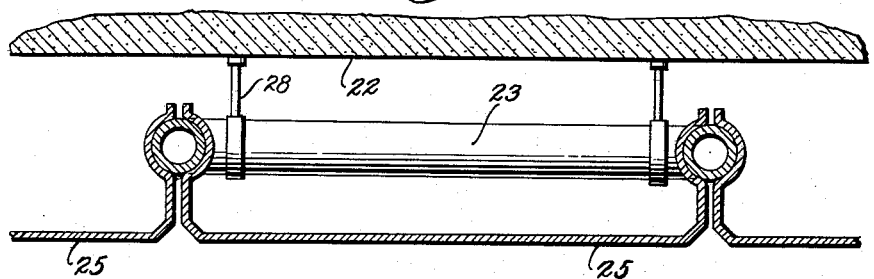
Figure 5 is a view similar to Figure 4 except showing a panel made up of plates that are not provided with insulating material.
Figure 6:
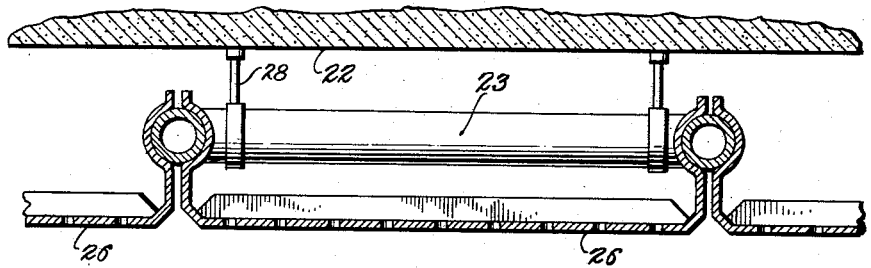
Figure 6 is a view similar to Figure 5 but showing a perforated plate.
Figure 7:
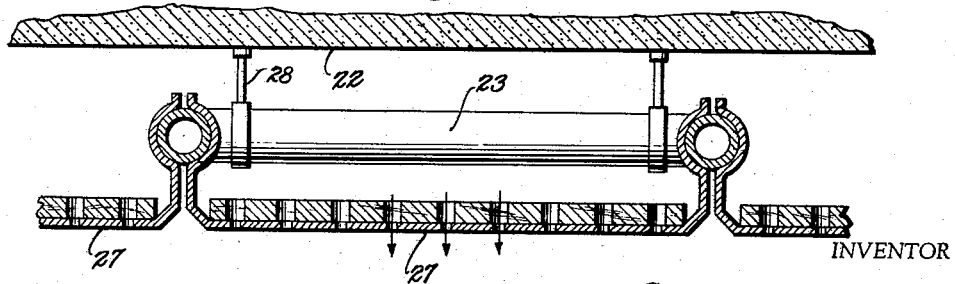
Figure 7 is a view similar to Figure 4 but showing perforated insulating material supported on the upper face of the panel.

In Figures 4, 5, 6 and 7, modifications in the structure of the panel are shown, and in these figures, the ceiling is designated by numeral 22, the pipes by numeral 23 and the panels by numerals 24 in Figure 4, 25 in Figure 5, 26 in Figure 6 and 27 in Figure 7. In all of these figures the pipes 23 are supported from the ceiling 22 by brackets 28. The panels are held from the pipes by marginal flanges on the panel which are similar to those shown in Figure 1. In Figure 4 the panel 24 is imperforate but is provided with insulating material 24a, such as glass wool, rock wool or the like, above its upper surface. In Figure 5 the panel 25 is not provided with insulating material. In Figure 6 the panel 26 is perforate and is not provided with insulating material, while in Figure 7, the panel is perforate and is provided with insulating material which is also perforate.

It is to be noted in all of the examples of the invention shown in Figures 1 to 7, inclusive, that the marginal flanges on the panels 11, 17 and 25 to 27, inclusive, have such bias that they abut against the pipes with a relatively heavy pressure. Thus the flanges of the panels function mechanically to support the panel from the pipe and provide a path of high thermal conductivity between the pipe and the panel. The plates or panels are made of thin sheet metal such as aluminum or aluminum alloy, of a thickness from ½ to 1 mm. The arrangement is quite free of inertia and easy access may be had to the pipe system because the panels are resiliently held in position and may be pried loose if necessary.

It is, of course, not necessary that the entire wall or ceiling areas comprise heat radiating panels, and where the panels are perforated and air is supplied through them, not all of the panels need to be perforated but only enough of them for proper distribution.

In all of Figures 1 to 7, inclusive, it will be noted that the flanges of adjacent panels are spaced apart to some extent so that as the panels heat and expand, the space between the panels is closed but the radiation surface itself is not warped.

It will be evident that a system of the type described may be placed in position after the ceiling structure proper has been built. It is only necessary to suspend the pipe system in some suitable manner below the supporting ceiling structure and then to thrust the panels upwardly so that the side edges thereof grip the pipes. Pipes and panels may also be pre-attached to each other as units ready for mounting or suspending.

In Figure 8, two panels 29 are shown having flanges 30 which engage and partially surround pipe 31. In this case, the flanges 30 are pressed into tight engagement with the pipe 31 by means of a loose clip 32 which can be drawn into tight engagement by a bolt and nut 33. In Figure 9, a resilient clip 34 acts on the flange 35 of a panel 36 to hold the same in tight engagement against a heating or cooling pipe 37. In Figure 10, flanges 38 of panels 39 extend upwardly on opposite sides of a flange 40 which is attached to and extends down from the pipe, and flanges 38 are bolted to the flange 40 to maintain good pressure content.

In Figure 11, flanges 41 of panels 42 are bent over at the top to a horizontal plane which, at that surface of the flanges, is in contact with a T-bar 43 attached to a heating or cooling pipe 44. Strips 45 and 46 lie under the horizontal portions of the flanges 41 and bolts pass through strips 45 and 46, flanges 41 and the horizontal portion of the T-bar 43 to hold the assembly connected.

In Figure 12, the panels are designated by numeral 47 defining together a sub-ceiling below a main ceiling 48. The pipes which heat panels 47 are designated by numeral 49 and are held by hangers 50 from the main ceiling 48. Air is admitted from the outside through a port 51 controlled by a damper 52 and flows into the space between panels 47 and ceiling 48. It is distributed to the room through perforations in the panels 47 or through a space between the panels. The panels and pipes may be insulated by the arrangement shown in Figures 2 and 3 if desired. The panel arrangement, if it does not cover the entire room, may be provided with an air exhaust aperture 53 at an edge, and the room as a whole is provided with an air exhaust port 54. A layer of insulation 55 lies above the pipes 49 and against the ceiling 48. If the panels 47 are not heat insulated they may warm the air passing thereover. The panels may lie partly insulated and partly exposed at their upper surface to the air admitted through damper 52. The numeral 56 represents a screen.

In the foregoing text, a number of panels have been described which are provided with apertures and it has been explained how these apertures function in the supply of air to the room. It is to be understood also that the perforations in the panels, together with an insulating material, such as glass wool or rock wool, placed above the panels, may in any instance act as sound-deadening means. As a matter of fact, the acoustic effect does not require that the perforations pass entirely through the panels and in Figure 13 there is shown an arrangement in which a panel 57 is provided with numerous indentations 58 upon the surface facing the room.

While the foregoing invention has been described with respect to but a few embodiments thereof, it is understood that those skilled in the art may be able, on the basis of the examples given, to adapt the invention to various types of installations that may be required.

I claim:

1. As a new article of manufacture, a structure adapted to modify both the temperature and the acoustic characteristics of a space, said structure comprising elongated members adapted to conduct fluid and to be connected to a source of temperature-modifying fluid, a panel, means supported by said members and connected to said panel to establish between the members and the panel a path of thermal conductivity, said panel being thermally conductive and sound transparent, and sound absorbing material acoustically exposed to said panel on the side thereof opposite said space.

2. A combined radiant heating or cooling and acoustic system for a space comprising a building structure, a plurality of elongated temperature-modifying members, a thermally conductive and sound transparent panel, metallic means of high thermal conductivity providing a substantially direct path between said members and said panel, and sound absorbing material acoustically exposed to said panel between said panel and said structure.

3. A combined radiant heating or cooling and acoustic system for a room having a wall or ceiling building structure, said system comprising a plurality of elongated temperature modifying members supported from said structure and a plurality of sound transparent, heat conductive plates supported from said members and resiliently removably attached thereto and sound absorbing material between said plates and said structure.

4. A combined radiant heating or cooling and ventilating system for a space comprising a building structure, a plurality of elongated temperature-modifying members, a thermally conductive panel, metallic means of high thermal conductivity providing a substantially direct path between said members and said panel, said panel having distributed apertures therein, and means to deliver ventilating air to the space between said structure and said panel.

5. A radiant heating or cooling or ventilating system for a room having a wall or ceiling building structure, said system comprising a plurality of elongated temperature-modifying members supported from said structure, a plurality of heat conductive plates supported from said members and resiliently removably attached thereto, said plates together defining a radiation panel, said panel having distributed apertures therein, and means to deliver ventilating air to the space between said panel and said building structure.

6. A combined radiant heating or cooling, ventilating and acoustic system for a space comprising a building structure, a plurality of elongated temperature-modifying members, a thermally conductive and sound transparent panel having distributed apertures therethrough, metallic means of high thermal conductivity providing a substantially direct path between said members and said panel, sound absorbing material acoustically exposed to said panel between said panel and said structure, and means to supply ventilating air between said panel and said structure to be distributed to said space through said apertures.

7. A combined radiant heating or cooling and acoustic system for a room having a wall or a ceiling building structure, said system comprising a plurality of elongated temperature-modifying members supported from said structure and a plurality of sound transparent heat conductive panels, said panels having metal flanges supporting them from said members and providing a substantially direct path of thermal conductivity between said members and said panels, and sound absorbing material acoustically exposed to said panels between said panels and said structure.

8. A radiant heating or cooling system for a room having a wall or a ceiling building structure, said system comprising a plurality of elongated temperature modifying members supported solely from said structure and a plurality of flat heat conductive panels having marginal flanges, one flange of each adjacent panels being supported from a common one of said members, adjacent edges of adjoining panels being spaced apart a small but appreciable distance to allow for expansion, said panels together defining a substantially continuous surface, the supporting flanges of said panels resiliently removably engaging the respective member to render each panel individually insertable and removable from the space to which said continuous surface is exposed.

9. A combined radiant heating or cooling and acoustic system for a room having a wall or ceiling building structure, said system comprising a plurality of elongated temperature modifying members supported from said structure and a plurality of substantially sound pervious, heat conductive plates supported from said members and resiliently removably attached thereto and sound absorbing material between said plates and said structure.

10. A combined radiant heating or cooling and acoustic system for a room having a wall or a ceiling building structure, said system comprising a plurality of elongated temperature-modifying members supported from said structure and a plurality of substantially sound pervious heat conductive panels, said panels having metal flanges supporting them from said members and providing a substantially direct path of thermal conductivity between said members and said panels, and sound absorbing material acoustically exposed to said panels between said panels and said structure.

11. As a new article of manufacture, a structure adapted to modify both the temperature and the acoustic characteristics of a space, said structure comprising elongated members adapted to conduct fluid and to be connected to a source of temperature-modifying fluid, a planar panel, means supported by said members and connected to said panel to establish between the members and the panel a path of thermal conductivity, said panel being thermally conductive and substantially sound pervious, and sound absorbing material acoustically exposed to said panel on the side thereof opposite said space.

12. A combined radiant heating or cooling and acoustic system for a space comprising a building structure, a plurality of elongated temperature-modifying members, a thermally conductive and substantially sound pervious planar panel, metallic means of high thermal conductivity providing a substantially direct path between said members and said panel, and sound absorbing material acoustically exposed to said panel between said panel and said structure.

13. A wall comprising a metallic facing formed of a plurality of metal pans having flanges projecting rearwardly from a perforated face panel, sound-absorbing bodies within said pans, runners for supporting said pans, said runners comprising tubular members, the flanges of said pans including sections partially surrounding said runners, and means for supplying a heated fluid to said tubular members whereby said pans are heated by conduction and transmit heat by radiation to objects therebeyond.

14. A wall comprising a substantially sound pervious metallic facing formed of a plurality of pans, sound absorbing bodies within said pans, a plurality of conduits suspended from a base, said conduits defining tubular passageways for a fluid, members on said pans cooperating with said conduits for support therefrom, and means for supplying a heated fluid to said passageways.

UNITED STATES PATENTS

References Cited in the file of this patent

| | | |
|---|---|---|
| 1,771,269 | Musgrave et al. | July 22, 1930 |
| 2,172,771 | Norris | Sept. 12, 1939 |
| 2,226,061 | Kershaw | Dec. 24, 1940 |
| 2,276,788 | Norris | Mar. 17, 1942 |
| 2,382,340 | Smith | Aug. 14, 1945 |

FOREIGN PATENTS

| | | |
|---|---|---|
| 403,899 | Great Britain | Jan. 4, 1934 |
| 801,355 | France | May 16, 1936 |